United States Patent [19]
Britt et al.

[11] Patent Number: 6,161,017
[45] Date of Patent: Dec. 12, 2000

[54] METHOD OF ROUTING CALLS TO PORTABLE NUMBERS IN A RADIO TELECOMMUNICATIONS NETWORK

[75] Inventors: Margaret Britt, Pointe-Claire; Nadia Bishai, Town of Mount Royal, both of Canada

[73] Assignee: Telefonaktiebolaget LM Ericsson, Stockholm, Sweden

[21] Appl. No.: 09/140,713

[22] Filed: Aug. 26, 1998

Related U.S. Application Data

[60] Provisional application No. 60/061,241, Oct. 7, 1997.

[51] Int. Cl.$^7$ ........................................... H04B 7/00
[52] U.S. Cl. ........................... 455/445; 455/433; 379/207
[58] Field of Search .................... 455/445, 422, 455/423, 433, 434, 435, 458; 379/220, 221, 219, 207, 230

[56] References Cited

U.S. PATENT DOCUMENTS

| | | | |
|---|---|---|---|
| 5,602,909 | 2/1997 | Carkner et al. | 379/207 |
| 5,661,792 | 8/1997 | Akinpelu et al. | 379/221 |
| 5,717,749 | 2/1998 | Sneed, Jr. et al. | 379/207 |
| 5,839,072 | 11/1998 | Chien | 455/445 |
| 5,878,347 | 3/1999 | Joensuu et al. | 455/433 |
| 5,953,663 | 9/1999 | Maupin et al. | 455/433 |
| 6,049,714 | 4/2000 | Patel | 455/433 |
| 6,058,313 | 5/2000 | Slutsman et al. | 455/445 |

FOREIGN PATENT DOCUMENTS

| | | |
|---|---|---|
| 2185376 | 3/1997 | Canada. |
| 0710042A2 | 5/1996 | United Kingdom. |
| WO 97/31489 | 8/1997 | WIPO. |

*Primary Examiner*—Reinhard J. Eisenzopf
*Assistant Examiner*—Duc Nguyen
*Attorney, Agent, or Firm*—Smith, Danamraj & Youst, P.C.

[57] ABSTRACT

A method of routing a call directed to a portable directory number in a radio telecommunications network having an originating mobile switching center (O-MSC), a home location register (HLR), and a Number Portability Database (NPDB). The O-MSC determines whether to send a Location Request (LOCREQ) message to the HLR for a routing number, or to send a Number Portability Request (NPREQ) message to the NPDB for a location routing number (LRN). The determination may be based on operator preference, a default preference, or statistics indicating that either the HLR or the NPDB is more likely to return a routing number. The O-MSC then attempts to obtain a routing number from the determined destination. If an error message is returned, the O-MSC attempts to obtain a routing number from the alternate destination. Upon receipt of a routing number, the O-MSC routes the call. In an alternative embodiment, the O-MSC may send the LOCREQ message and the NPREQ message simultaneously, and utilize the first routing number received to route the call.

6 Claims, 3 Drawing Sheets

METHOD OF ROUTING CALLS TO PORTABLE NUMBERS IN A RADIO TELECOMMUNICATIONS NETWORK

CROSS-REFERENCES TO RELATED APPLICATIONS

This application is related to provisional application Ser. No. 60/061,241 entitled, *System and Method for Routing Portable Mobile Directory Numbers*, filed Oct. 7, 1997.

BACKGROUND OF THE INVENTION

1. Technical Field of the Invention

This invention relates to telecommunication systems and, more particularly, to a method of routing a call directed to a portable directory number in a radio telecommunications network.

2. Description of Related Art

Number portability (service provider portability) allows subscribers to retain their directory numbers (DNs) as the subscribers "port" from one service provider to another. In a radio telecommunications network, when a call is placed to a portable DN, the originating mobile switching center (MSC) must send a query known as a Number Portability Request (NPREQ) to a Number Portability Database (NPDB) to obtain a routing address for that portable DN. However, when the call originates in a MSC that "owns" the DN, sending the NPREQ may not be necessary, and may be a waste of time and system resources. In this case, the MSC should send a routing number query such as a Location Request (LOCREQ) Invoke message to the home location register (HLR) to obtain a routing number. However, there is currently no process by which the MSC may give priority to one of the two queries (LOCREQ or NPREQ), or salvage a call if the chosen query does not return a useful result.

In order to overcome this disadvantage, it would be advantageous to have a method of prioritizing the LOCREQ and NPREQ queries, and salvaging a call if the chosen query does not return a useful result. The present invention provides such a method.

SUMMARY OF THE INVENTION

In one aspect, the present invention is a method of routing a call directed to a portable directory number in a radio telecommunications network having an originating mobile switching center (O-MSC), a home location register (HLR), and a Number Portability Database (NPDB). The method includes the steps of attempting to obtain a first routing number from the HLR, obtaining a second routing number from the NPDB upon receiving an error message from the ILR, and routing the call to the second routing number.

In another aspect, the present invention is a method of routing a call directed to a portable directory number which includes the steps of determining in the O-MSC whether to send a first routing number request to a first destination or an alternate destination, sending the first routing number request to the first destination, and determining whether a routing number was received in the O-MSC in response to the first routing number request. This is followed by sending a second routing number request to the alternate destination upon determining that a routing number was not received in the O-MSC in response to the first routing number request, receiving a routing number in response to the second routing number request, and routing the call to the routing number received in response to the second routing number request.

In still another aspect, the present invention is a method of routing a call directed to a portable directory number in a radio telecommunications network which includes the steps of simultaneously sending routing number requests from the O-MSC to the HLR and the NPDB, and utilizing the first routing number received to route the call.

In yet another aspect, the present invention is a method of routing a call directed to a portable directory number in a radio telecommunications network which begins by sending a first routing number request from the O-MSC to the HLR, the first routing number request including a dialed directory number. This is followed by determining in the HLR whether a routing number is assigned to the dialed directory number, and sending a second routing number request which includes the dialed directory number from the HLR to the NPDB upon determining that a routing number is not assigned to the dialed directory number in the HLR. This is followed by retrieving from the NPDB, a location routing number (LRN) assigned to the dialed directory number, sending the LRN from the NPDB to the HLR in a first response message, sending the LRN from the HLR to the O-MSC in a second response message, and routing the call to the LRN.

BRIEF DESCRIPTION OF THE DRAWINGS

The invention will be better understood and its numerous objects and advantages will become more apparent to those skilled in the art by reference to the following drawings, in conjunction with the accompanying specification, in which.

DETAILED DESCRIPTION OF EMBODIMENTS

Figure 1:
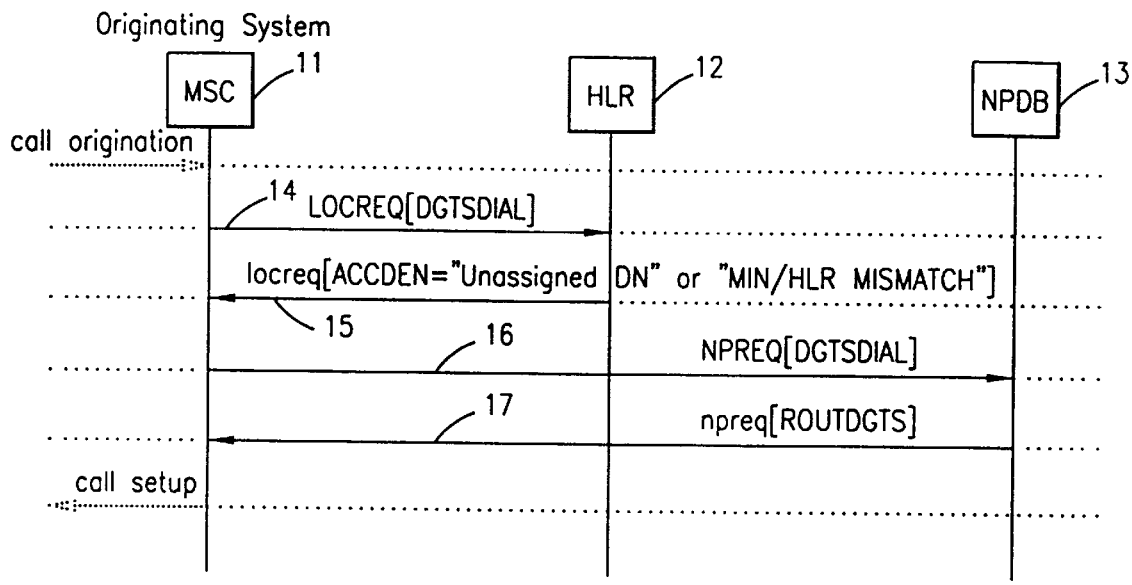
FIG. 1 is a message flow diagram illustrating the flow of messages between the nodes of a radio telecommunications network in a first embodiment of the present invention.

FIG. 1 is a message flow diagram illustrating the flow of messages between the nodes of a radio telecommunications network in a first embodiment of the present invention. The network includes an originating MSC 11, a home location register (HLR) 12, and a Number Portability Database (NPDB) 13. The originating MSC may be a gateway mobile switching center (G-MSC) where a call enters the Public Land Mobile Network (PLMN) from another network such as the Public Switched Telephone Network (PSTN), or it may be an originating mobile switching center (O-MSC) where a call originates within the PLMN.

For calls originating in the O-MSC 11 (or arriving at a G-MSC) without an indication that a NP query has been performed, the O-MSC determines whether it "owns" the dialed DN, and if so, first attempts to route the call normally by sending a Location Request Invoke message (LOCREQ) 14 to the HLR 12. However, the DN ownership determination may be incorrect because in mobile networks, the DN ownership is actually determined in the HLR, and the information available in the MSC is incomplete since the O-MSC does not permanently retain individual subscriber records, but must query the HLR for this information. If the DN ownership determination was correct, the HLR sends a Location Request Return Result message (locreq) 15 to the O-MSC with a routing number. If the DN ownership determination was incorrect, the HLR returns a response indicating that no subscriber record exists. For example, the HLR may send a locreq message with an Access Denied parameter indicating that the DN is unassigned, or the HLR may return an error code of MIN/HLR mismatch.

Rather than rejecting the call at this point, if the dialed DN belongs to a number series (e.g., NPA-NXX) that is identified in the O-MSC as being portable, the O-MSC sends a Number Portability Request Invoke message (NPREQ) 16 to the NPDB 13, and includes a digits dialed parameter (DGTSDLAL) identifying the dialed DN. The NPDB sends a Number Portability Request Return Result message (npreq) 17 and includes a routing digits parameter (ROUTDGTS) which includes a Location Routing Number (LRN) which may be, for example, a 10-digit routing number in the North American Numbering Plan. The O-MSC then completes the call setup to the LRN. If the NPDB does not return a LRN in the npreq message 17, then error treatment is applied.

In the method of the present invention, when a call is received within the O-MSC, a decision is made regarding whether to send a LOCREQ message to the HLR or a NPREQ message to the NPDB. As shown above, if a LOCREQ message is sent to the HLR, and the HLR does not have a subscription for the DN, the O-MSC can then send a NPREQ message to the NPDB in an attempt to salvage the call. If the NPDB does not return a LRN, then error treatment is applied. Conversely, if the NPREQ message is sent first, and does not return a LRN, then the O-MSC can send a LOCREQ message to the HLR. If the HLR does not have a subscription for the DN, the call again fails.

To avoid inefficient signaling, the present invention determines in the O-MSC which approach is more likely to result in a successful routing number query. If few numbers in a portable range have been ported, it would be inefficient to query the NPDB first. Therefore, the O-MSC first sends a LOCREQ message to the HLR in an attempt to obtain a routing number. Conversely, if most of the numbers in a portable range have been ported, it would be inefficient to query the BLR first. Therefore, the O-MSC first sends a NPREQ message to the NPDB in an attempt to obtain a LRN.

Figure 2:
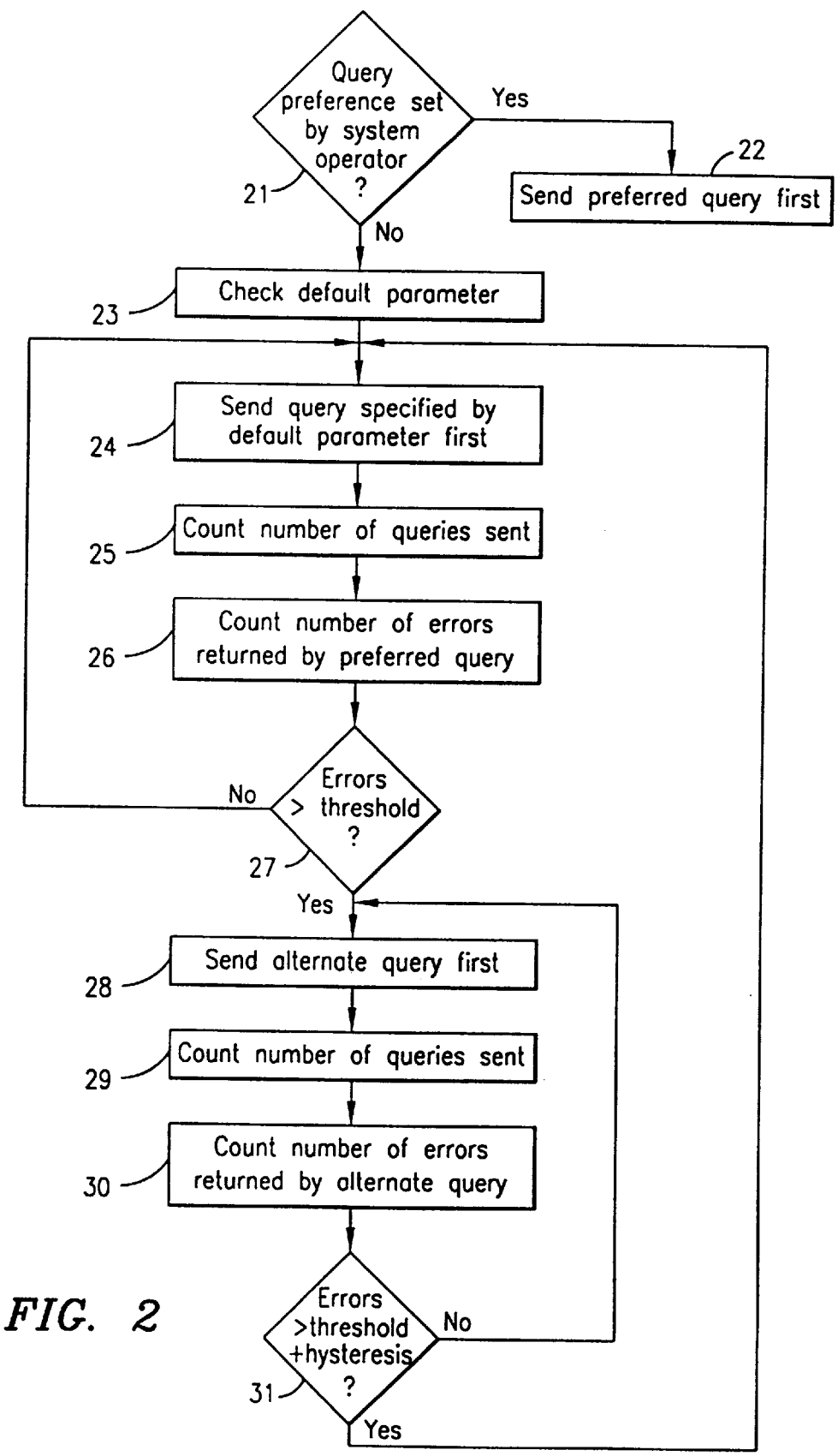
FIG. 2 is a flow chart of the steps of the present invention when determining the priority of routing number queries.

FIG. 2 is a flow chart of the steps of the present invention when determining the priority of routing number queries. At step 21, the system operator may set a parameter in the O-MSC to indicate which query should take precedence. This parameter may be a switch parameter applicable to all calls originated in the O-MSC, or the parameter may be restricted to calls directed to DNs within the portable number series. If it is determined that a parameter has been set, the method moves to step 22 and sends the preferred query first.

If, however, a preference has not been set by the operator, the method moves to step 23 and checks a default parameter establishing a preference for a particular query in the O-MSC. The O-MSC then sends the default query first at step 24. At steps 25 and 26, the O-MSC then keeps a statistical counter of the number of queries sent and the number of error results returned by the preferred query. At 27, it is determined whether a preset statistical threshold of returned error messages in opposition to the default preference has been exceeded. If the error threshold is not exceeded, the method returns to step 24 and continues to send the default query first. However, if the error threshold is exceeded, the default preference is overwritten with the alternate option at step 28, and the method begins sending the alternate query first. For example, if the LOCREQ query is given preference, the O-MSC keeps statistics of the number of LOCREQs sent to the HLR for DNs within a particular number series. The O-MSC also keeps count of the number of HLR responses that indicate that the DN is unassigned. When the number of unassigned responses exceeds a threshold such as, for example 50 percent, the preference for that number series is changed to give precedence to NPREQ queries.

At steps 29 and 30, the O-MSC then keeps a statistical counter of the number of queries sent and the number of error results returned by the alternate query. At step 31, the method may also utilize a hysteresis value to prevent excessive oscillations of the preference parameter. In this step, it is determined whether or not a preset statistical threshold of returned error messages plus a hysteresis value has been exceeded. For example, a hysteresis value of 5 percent may be added to the 50 percent example used above, creating a new threshold value of 55 percent. If the new error threshold is not exceeded, the method returns to step 28 and continues to send the alternate query first. However, if the new error threshold is exceeded, the method returns to step 24 where the alternate preference is overwritten, and the method begins sending the default query first.

Figure 3:
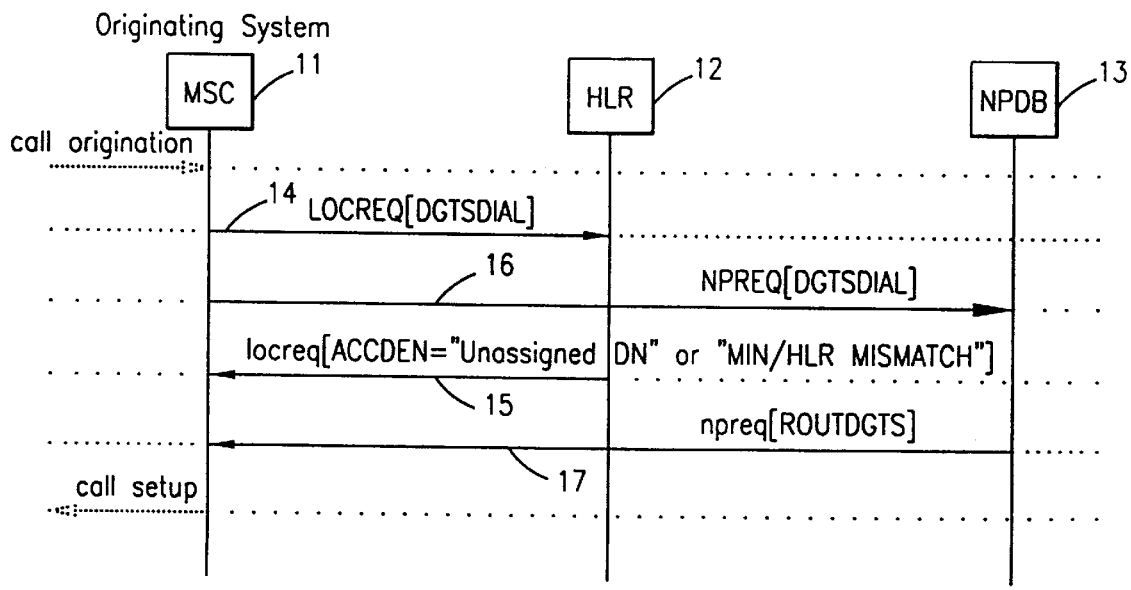
FIG. 3 is a message flow diagram illustrating the flow of messages between the nodes of a radio telecommunications network in a second embodiment of the present invention.

FIG. 3 is a message flow diagram illustrating the flow of messages between the nodes of a radio telecommunications network in a second embodiment of the present invention. In this embodiment, the O-MSC 11 simultaneously sends a LOCREQ message 14 to the HLR 12 and a NPREQ message 16 to the NPDB 13. The O-MSC then acts on the first response which includes a routing number. For example, if the locreq message 15 is received first, and includes an Access Denied parameter indicating that the DN is unassigned, then the O-MSC waits for the npreq message 17 with a LRN. Alternatively, if the npreq message is received first, and it does not contain a LRN, or if the response is otherwise useless (for example, the npreq message contains an LRN associated with the O-MSC), then the O-MSC waits for the locreq message to return a routing number. If the first response received includes a routing number, the call is routed without waiting for the second response. If both return result messages return errors, then an error has occurred, and error treatment is applied.

Figure 4:
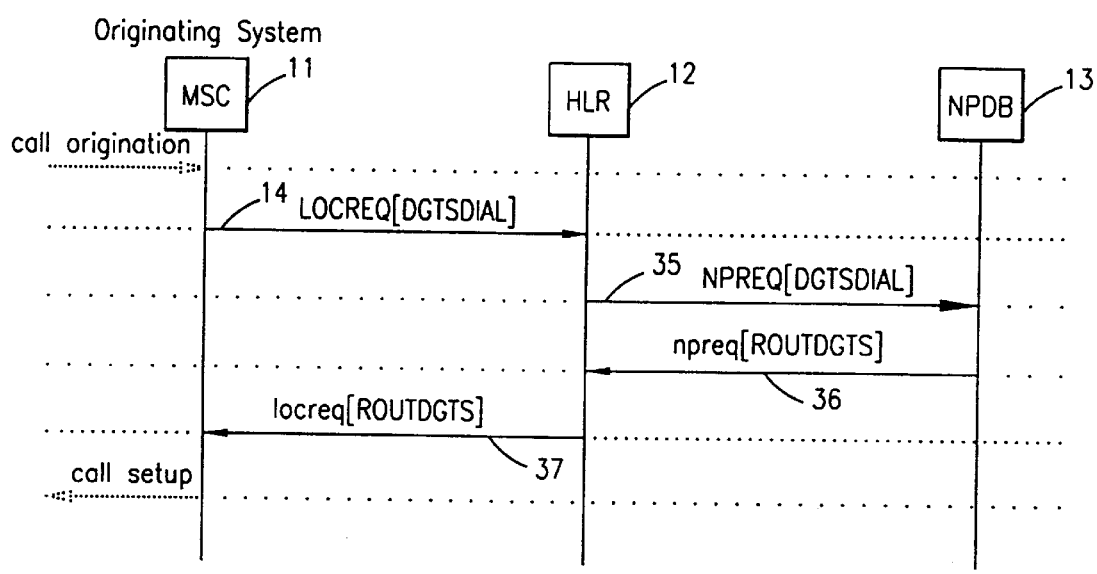
FIG. 4 is a message flow diagram illustrating the flow of messages between the nodes of a radio telecommunications network in a third embodiment of the present invention.

FIG. 4 is a message flow diagram illustrating the flow of messages between the nodes of a radio telecommunications network in a third embodiment of the present invention. The O-MSC first attempts to route the call normally by sending a LOCREQ message 14 to the HLR 12. In this embodiment, the HLR is modified to send a NPREQ message 35 to the NPDB 13 when the HLR does not have a subscription for the DN identified in the DGTSDIAL parameter of the LOCREQ message, and the DN is in a portable number series. The NPDB then returns the LRN in a npreq message 36 sent to the HLR. The HLR, in turn, includes the LRN in a locreq message 37 sent to the O-MSC. The O-MSC then completes the call setup to the LRN.

It is thus believed that the operation and construction of the present invention will be apparent from the foregoing description. While the method shown and described has been characterized as being preferred, it will be readily apparent that various changes and modifications could be made therein without departing from the scope of the invention as defined in the following claims.

What is claimed is:

1. A method of routing a call directed to a portable directory number in a radio telecommunications network having an originating mobile switching center (O-MSC), a home location register (HLR), and a Number Portability Database (NPDB), said method comprising the steps of:

determining in the O-MSC whether to send a first routing number request to a first destination or an alternate destination;

sending the first routing number request to the first destination;

determining whether a routing number was received in the O-MSC in response to the first routing number request;

sending a second routing number request to the alternate destination, upon determining that a routing number was not received in the O-MSC in response to the first routing number request;

receiving a routing number in response to the second routing number request; and routing the call to the routing number received in response to the second routing number request.

2. The method of routing a call directed to a portable directory number of claim 1 wherein the step of determining in the O-MSC whether to send a first routing number request to a first destination or an alternate destination includes the steps of:

determining whether a preferred destination has been set by a system operator; and selecting the preferred destination to receive the routing number query.

3. The method of routing a call directed to a portable directory number of claim 1 wherein the step of determining in the O-MSC whether to send a first routing number request to a first destination or an alternate destination includes the steps of:

determining whether a default parameter has been set that specifies a preferred destination; and selecting the default destination to receive the routing number query.

4. The method of routing a call directed to a portable directory number of claim 3 wherein the step of determining in the O-MSC whether to send a first routing number request to a first destination or an alternate destination also includes the steps of:

calculating a first error percentage, said first error percentage being a percentage of queries sent to the default destination that return error responses;

determining whether the first error percentage exceeds a first predefined threshold; and selecting the alternate destination to receive the routing number query upon determining that the first error percentage exceeds the first predefined threshold.

5. The method of routing a call directed to a portable directory number of claim 4 wherein the step of determining in the O-MSC whether to send a first routing number request to a first destination or an alternate destination also includes the steps of:

calculating a second error percentage, said second error percentage being a percentage of queries sent to the alternate destination that return error responses;

determining whether the second error percentage exceeds a second predefined threshold; and selecting the default destination to receive the routing number query upon determining that the second error percentage exceeds the second predefined threshold.

6. The method of routing a call directed to a portable directory number of claim 5 wherein the step of determining whether the second error percentage exceeds a second predefined threshold includes determining whether the second error percentage exceeds a threshold equaling the first predefined threshold plus a hysteresis value.

* * * * *